United States Patent [19]

Eschner

[11] 4,265,845

[45] May 5, 1981

[54] PROCESS FOR THE PRODUCTION OF A CERAMIC HEAT-RETAINING BRICK

[75] Inventor: Axel Eschner, Wiesbaden, Fed. Rep. of Germany

[73] Assignee: Didier-Werke AG, Wiesbaden, Fed. Rep. of Germany

[21] Appl. No.: 97,545

[22] Filed: Nov. 26, 1979

[30] Foreign Application Priority Data

Nov. 25, 1978 [DE] Fed. Rep. of Germany ....... 2851083

[51] Int. Cl.$^3$ .............................................. C04B 35/20
[52] U.S. Cl. ....................................... 264/63; 106/60; 264/65
[58] Field of Search ...................... 106/60; 264/65, 66, 264/63

[56] References Cited

U.S. PATENT DOCUMENTS

| | | | |
|---|---|---|---|
| 3,285,761 | 11/1966 | Hare et al. | 106/60 |
| 3,288,617 | 11/1966 | Heuer | 106/60 |
| 3,297,457 | 1/1967 | Charvat | 106/60 |
| 3,312,557 | 4/1967 | Havranek et al. | 106/60 |

*Primary Examiner*—Jeffery R. Thurlow
*Attorney, Agent, or Firm*—Wenderoth, Lind & Ponack

[57] ABSTRACT

There is disclosed a process for the production of a ceramic heat-retaining brick based on olivine which comprises shaping and drying a mixture of granular material and a binding agent. The granular material includes powdered iron having a particle size of less than 0.1 mm in an amount of between 5 and 20% by weight of the brick. The brick is subsequently burnt in an oxidizing atmosphere and the powdered iron is substantially converted to iron oxide.

6 Claims, No Drawings

PROCESS FOR THE PRODUCTION OF A CERAMIC HEAT-RETAINING BRICK

The invention relates to a process for the production of a ceramic heat-retaining brick based on olivine by shaping, drying and optionally burning a mixture of granular material and a binding agent.

It is known to use ceramic heat-retaining bricks based on fire-clay, basalt, olivine, chromite, iron ore and sintered magnesite in electric storage heating apparatus. Apart from the thermal conductivity of the heat-retaining bricks, a critical factor in the performance of such bricks is their thermal storage capacity, which depends upon the specific heat and the density of the bricks and which in the bricks of the types referred to is highest in a commercially available heat-retaining brick based on sintered magnesite.

German Auslegeschrift No. 1954724 discloses a storage core for electric storage heating apparatus which is made by pressing and sintering finely divided particles of ferric oxide. Production of these bricks is very costly and the bricks produced tend to be unsatisfactory in that they are cracked and deformed after burning. The bricks have a high thermal storage capacity if they are of high density, but by comparison with magnesia bricks they have a low thermal conductivity and too high a weight for use in electric storage heating apparatus.

In an attempt to improve the thermal storage capacity of heat-retaining bricks based on olivine, quantities of sintered magnesia and iron and chrome ores have been used in production up to a level of 20% by weight, but without significant success. In bricks containing quantities of sintered magnesia the increase in specific heat obtained by the mixture is offset by a reduction in the density. In bricks containing quantities of iron ore the increased density was offset by the reduction in specific heat.

An object of the invention is to provide a process for the production of a ceramic heat-retaining brick containing iron oxide based on olivine using known technology to produce bricks having an increased thermal storage capacity, preferably using the cheap starting material olivine.

It has been found that such bricks can be obtained by using fine particles of metallic iron in the starting mixture.

According to the present invention a process for the production of a ceramic heat-retaining brick based on olivine comprises shaping and drying a mixture of granular material and a binding agent, the granular material including powdered iron having a particle size of less than 0.1 mm, and preferably less than 0.06 mm, in an amount of between 5 and 20%, and preferably 5 and 15% by weight of the brick. The process preferably also includes the step of burning the brick in an oxidising atmosphere at a temperature not exceeding 1550° C., and preferably not exceeding 1400° C.

With a powdered iron content of less than 5% by weight an insignificant increase in thermal storage capacity was obtained, and with a content over 20% by weight of powdered iron no significant further improvement in thermal storage capacity was achieved.

The heat-retaining brick produced by the process advantageously contains magnesium silicate in the form of forsterite and iron powder largely converted to iron oxide by burning.

In the production of the brick according to the invention, conventional binding agents can be used in the mixture, such as, for example, sulphite waste liquor or a small quantity of clay and phosphate binding agent, such as sodium polyphosphate, as disclosed in German Pat. No. 2162747. In the latter case the bricks are used in unburnt form in the heat storage apparatus.

When the shaped piece produced from the mixture by pressing and drying is burnt, the ceramic bonding and sintering and oxidation of the iron powder to iron oxide take place. After burning, or corresponding heat treatment which is carried out or continued during operation of the heat-retaining brick in the heat storage apparatus, a heat-retaining brick is obtained which has a relatively low porosity and a thermal storage capacity which is higher than that of a heat-retaining brick based on olivine alone and close to that of a heat-retaining brick based on sintered magnesia. The heat-retaining brick obtained also has increased thermal conductivity.

Further features and details of the invention will be apparent from the following seven examples for which the percentage of the various constituents is given in Table 1, and the physical properties are given in Table 2.

Each example relates to a method of producing heat retaining bricks, in which in the starting mixtures the olivine and sintered magnesia had the following compositions in percentage by weight:

|  | Olivine | Sintered magnesia |
|---|---|---|
| $SiO_2$ | 41 | 5 |
| $Al_2O_3$ | 1 | 1 |
| $Fe_2O_3$ | 7 | 1 |
| CaO |  | 2 |
| MgO | 50 | 91 |
| Loss on ignition | 1 |  |

In each case the olivine comprised a mixture of three different classes graded by particle size. The prepared mixtures had binding agents added and were then pressed at 100 N/mm² to form bricks, dried at 110° C. and, in the case of burnt bricks, were burnt in a gas-heated chamber furnace or, in the case of unburnt bricks (examples 4 and 5), were tempered at low temperatures. During burning the iron is substantially converted to ferric oxide.

The specific heat of the heat-retaining bricks was determined with a water calorimeter at a particle size of 2 to 8 mm. The heat conductivity was determined by the plate process.

In examples 2 to 5, which are in accordance with the invention higher values for the density or lower values for the total porosity, an equal or higher thermal conductivity and generally higher thermal capacity were obtained than in examples 1, 6 and 7. The burnt bricks according to the invention do not undergo any expansion on burning, but in fact contract slightly, as do the burnt bricks containing only olivine and binding agents in accordance with example 1 and containing olivine, iron oxide and binding agents in accordance with example 6. In heat-retaining bricks containing olivine, magnesia sinter and binding agents in accordance with example 7 perceptible expansion does occur on burning. In example 3 burning at higher temperatures leads to a marked worsening of the results, for example, an increased linear expansion of 0.7%, and the formation of cracks in the bricks.

TABLE 1

| Example No. | 1 | 2 | 3 | 4 | 5 | 6 | 7 |
| --- | --- | --- | --- | --- | --- | --- | --- |
| Olivine 1–3mm % by weight | 50 | 45 | 50 | 50 | 50 | 40 | 45 |
| 0–1mm by weight | 30 | 30 | 25 | 25 | 25 | 40 | 35 |
| under 0.09mm by weight | 20 | 20 | 15 | 15 | 5 | 10 | |
| Sintered Magnesia of less than 0.1mm % by weight | | | | | | | 20 |
| $Fe_2O_3$ of less than 0.06mm % by weight | | | | | | 10 | |
| Iron Powder (iron sponge) of less than 0.06mm % by weight | | 5 | 10 | 10 | 20 | | |
| Sulphite waste liquor 1:1 dilute solution % by weight | +2 | +2 | +2 | | | +2 | +2 |
| Wind-sifted clay (38/40% $Al_2O_3$) % by weight | | | | +2 | +2 | | |
| Sodium polyphosphate | | | | +2 | +2 | | |
| Tempering °C. (for 4 hours) | | | | 600 | 600 | | |
| Burning °C. (for 4 hours) | 1400 | 1400 | 1400 | | | 1400 | 1580 |

TABLE 2

| Example No. | 1 | 2 | 3 | 4 | 5 | 6 | 7 |
| --- | --- | --- | --- | --- | --- | --- | --- |
| Density g/cm$^3$ | 2.80 | 2.92 | 3.04 | 3.02 | 3.10 | 2.82 | 2.70 |
| Porosity Volume % | 15.0 | 14.1 | 12.0 | 12.2 | 14.0 | 17.0 | 23.0 |
| Effect of burning - expansion % linear | −0.2 | −0.4 | −0.4 | | | −0.5 | +0.5 |
| Cold compression strength N/mm$^2$ | 77 | 133 | 110 | 90 | 75 | 119 | 35 |
| Thermal conductivity W/mK (at 800° C.) | 1.2 | 1.5 | 1.8 | 1.7 | | 1.25 | 1.5 |
| Specific heat kJ/kgK (at 20°–800° C.) | 1.04 | 1.03 | 1.02 | 1.02 | 1.0 | 1.03 | 1.05 |
| Thermal storage capacity kJ/m$^3$K | 2912 | 3008 | 3100 | 3080 | 3100 | 2900 | 2835 |

I claim:

1. In a process for the production of a ceramic heat-retaining brick made up of a mixture of a granular material and a binding agent which comprises shaping and drying a mixture of the granular material and a binding agent, the improvement in which the granular material comprises olivine as the principal constituent and contains powdered iron having a particle size of less than 0.1 mm present in an amount between about 5 and 20% by weight of the brick.

2. A process as claimed in claim 1 in which the brick is subsequently burned in an oxidizing atmosphere at a temperature not exceeding 1550° C.

3. A process as claimed in claim 2 in which the temperature does not exceed 1400° C.

4. A process as claimed in one of claims 1, 2 or 3 in which the granular material includes 5 to 15% by weight of powdered iron.

5. A process as claimed in any one of claims 1, 2 or 3 in which the powdered iron has a particle size of less than 0.06 mm.

6. A process as claimed in claims 2 or 3 wherein the resulting brick, also contains magnesium silicate in the form of forsterite and wherein the iron powder is substantially converted to iron oxide.

* * * * *